US007723862B1

(12) United States Patent
Spillman et al.

(10) Patent No.: US 7,723,862 B1
(45) Date of Patent: May 25, 2010

(54) STREET LIGHT AUXILIARY POWER CONVERTER FOR ANCILLARY DEVICES

(75) Inventors: Vance Spillman, Bristol, RI (US); Craig Rosenquist, Scituate, MA (US); Jeremy Belknap Barber, South Easton, MA (US)

(73) Assignee: Sunrise Technologies, Inc., Rayham, MA (US)

( * ) Notice: Subject to any disclaimer, the term of this patent is extended or adjusted under 35 U.S.C. 154(b) by 408 days.

(21) Appl. No.: 11/649,067

(22) Filed: Jan. 3, 2007

Related U.S. Application Data

(60) Provisional application No. 60/798,578, filed on May 8, 2006.

(51) Int. Cl.
*H02J 3/00* (2006.01)
(52) U.S. Cl. ............................ 307/12; 307/11
(58) Field of Classification Search ................... 307/12, 307/11
See application file for complete search history.

(56) References Cited

U.S. PATENT DOCUMENTS

| 4,731,551 | A  | * | 3/1988  | Gibbs et al. | 307/141  |
| 6,811,444 | B2 | * | 11/2004 | Geyer        | 439/650  |
| 2005/0236557 | A1 | * | 10/2005 | Hurst     | 250/214 R |

* cited by examiner

*Primary Examiner*—Fritz M Fleming
*Assistant Examiner*—Dru M Parries
(74) *Attorney, Agent, or Firm*—Strategic Patents, P.C.

(57) ABSTRACT

A system and device for using the power provided to street and area lights or other outdoor installations to power auxiliary devices which require a power supply which is different from line voltage for their power requirements. A device adapted to be connected to the NEMA three pole receptacle on a street or area light which converts the line voltage provided to the outdoor installation into a power form required by one or more auxiliary devices which cannot directly use the line current or voltage. The appropriate electrical connector for the auxiliary device may be included. Among the conversions: line voltage up to 480 volts alternating current converted to a user's specified voltage for WiFi, radios, surveillance cameras, traffic monitoring, other monitoring, security cameras, other communications, and UPS systems; DC voltage for the above applications and others; and power over ethernet conversion (for example, 48 volt direct current, 420 milliamperes).

13 Claims, 6 Drawing Sheets

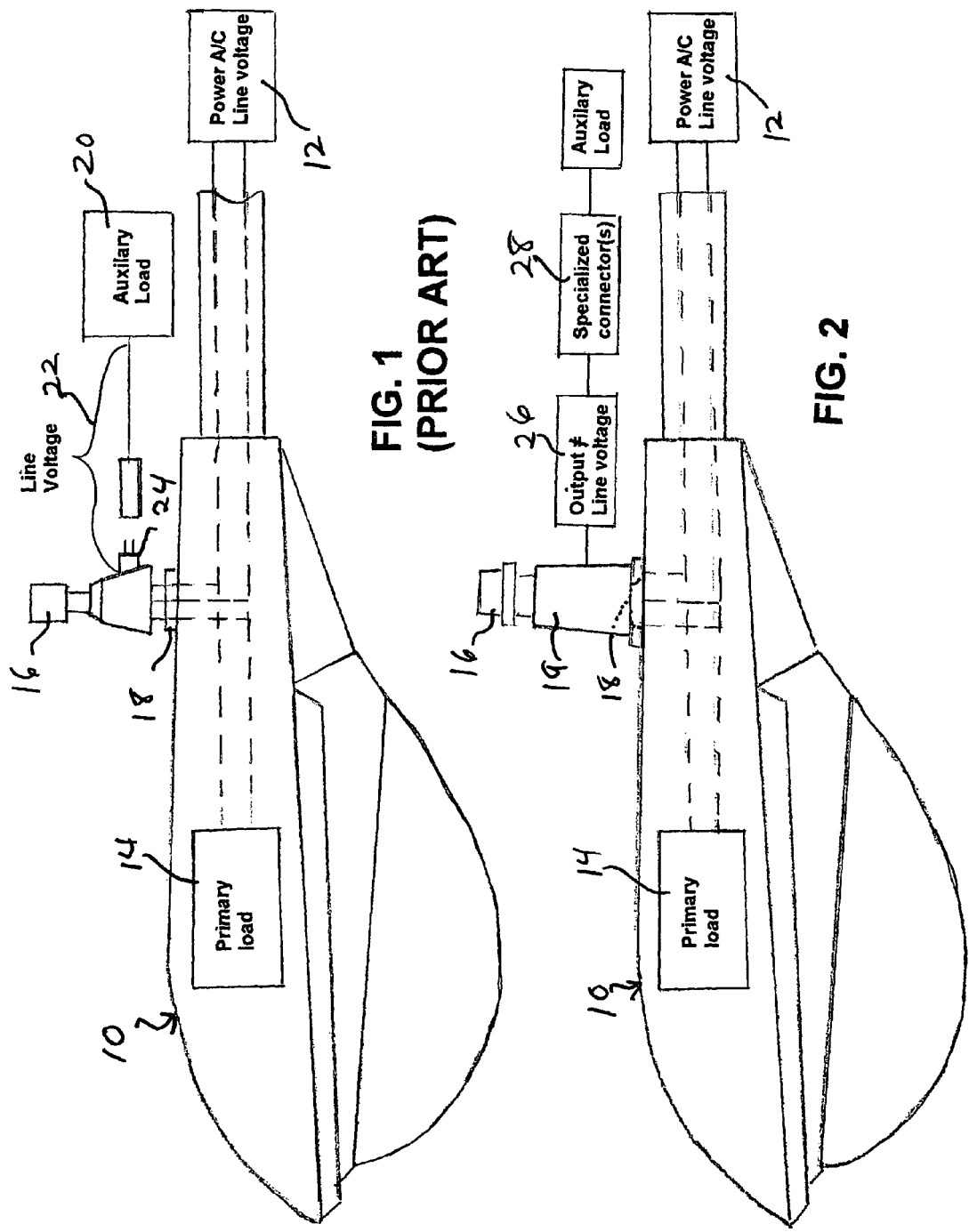

STREET LIGHT AUXILIARY POWER CONVERTER FOR ANCILLARY DEVICES

CROSS-REFERENCE TO RELATED APPLICATIONS

This application claims the benefit under 35 U.S.C. §119(e) of prior U.S. Provisional Application No. 60/798,578 filed May 8, 2006; which is hereby incorporated by reference.

STATEMENT REGARDING FEDERALLY SPONSORED RESEARCH OR DEVELOPMENT

This invention has been created without the sponsorship or funding of any federally sponsored research or development program.

FIELD OF THE INVENTION

This invention concerns the use of power supplied to external or outdoor lighting systems, such as street and area lamps, for additional or ancillary purposes.

BACKGROUND OF THE INVENTION

Street and outdoor area lights are installed either by the government or by private entities to provide illumination for safety, recreation, security, and other purposes. Such lights are often fitted with a National Electrical Manufactures Association locking three pole receptacle. This receptacle often accepts a twist lock photocontrol to control individual lights or a shorting cap when groups of lights are controlled by a common switch/relay. These street and area lights are powered by whatever is available for line voltage (nominally from 120 volt alternating current to 480 volt alternating current) electrical systems.

There are photocontrol and other devices available that install onto the street light (National Electrical Manufactures Association) locking three pole receptacle and provide a connection for switched or constant nominal line voltage as auxiliary power for other devices including, for example: holiday or decorative lights, WiFi and other communication systems, Universal Power Supply systems, and surveillance cameras. It is very convenient to access line voltage power from a street or area light using these recepticals for use by other devices installed on or near a light pole or other National Electrical Manufactures Association locking three pole installations. However, until the present invention, the technology was limited to providing: 1. continuous, 2. switched, and 3. timed and switched power. These all produced output at the electrical system nominal line voltage. If an auxiliary device required other than the nominal line voltage for operation, it needed to have either internal or external conversion means to convert the line voltage into a power that was usable by the device. An example of this kind of retrofit device is disclosed in U.S. Pat. No. 4,731,551 (Gibbs et al.). The disclosure of this patent is hereby incorporated in the present application by reference, as if it were set forth in its entirety herein.

This, in fact, required manufactures of such devices to either provide either internal or external transformer/rectification means, both of which complicate sales and device inventory control.

It is, therefore, a primary object of the present invention to expand the possibilities of tapping power from a street or area light power source by providing a wide range of auxiliary outputs.

Another object of the invention is to provide the versatility to choose the auxiliary output or multiple outputs for a given time, season, or circumstance.

Another object of the present invention is to provide a system and a device to allow customers to select the nature of the output tapped from the primary source so that their application can be applied to a properly equipped source without requiring internal or additional transformation/rectification.

Another object of the present invention is to provide an auxiliary power source from street or area lights which will provide power to such items as radios, cameras, and other devices, which power is already transformed to their power requirements, reducing the heat produced, extending the life, and reducing the cost of these products.

Another object is to provide a system whereby the radio, cameras, and other devices' connection points could be standardize to accept one connector for a single line input rather than having different models for the various electrical system line voltages. This would improve their manufacturing efficiency, reduce their costs, and simplify their inventory.

A still further object of this invention is to provide a product which would provide pre-established protection for the radios, cameras and other devices from line surge damage (for example, from lightning) which is common to street and area lights.

With these and other objects in view, as will be apparent to those skilled in the art, the invention resides in the combination of parts set forth in the specification and covered by the claims appended hereto, it being understood that changes in the precise embodiment of the invention herein disclosed may be made within the scope of what is claimed without departing from the spirit of the invention.

BRIEF SUMMARY OF THE INVENTION

This invention is essentially a power conversion device which may be adapted to be connected into the typical locking three pole receptacle in a standard outdoor lighting or other electrical installation which normally provides voltage at A/C of about 120 volts to 480 volts. The invention incorporates a transformer/rectifier capable of changing line voltage in one or several manners from the A/C line voltage to another form of power including changing the A/C line voltage to a different non-zero A/C voltage or, alternatively, converting the alternating current and voltage to a non-zero D/C (direct current) voltage.

In the preferred embodiment, the device is provided with one or more electrical connectors which are appropriate for the type of voltage and the type of auxiliary device which is being powered.

BRIEF DESCRIPTION OF THE DRAWINGS

The character of the invention, however, may be best understood by reference to one of its structural forms, as illustrated by the accompanying drawings in which:

FIG. 1 shows an earlier development in this technology, wherein the power from a street or area light has been tapped for an auxiliary device which uses the line voltage;

FIG. 2 illustrates the present invention wherein the output of the tapping of the power source is other than line voltage;

DETAILED DESCRIPTION OF THE INVENTION

Figure 3:
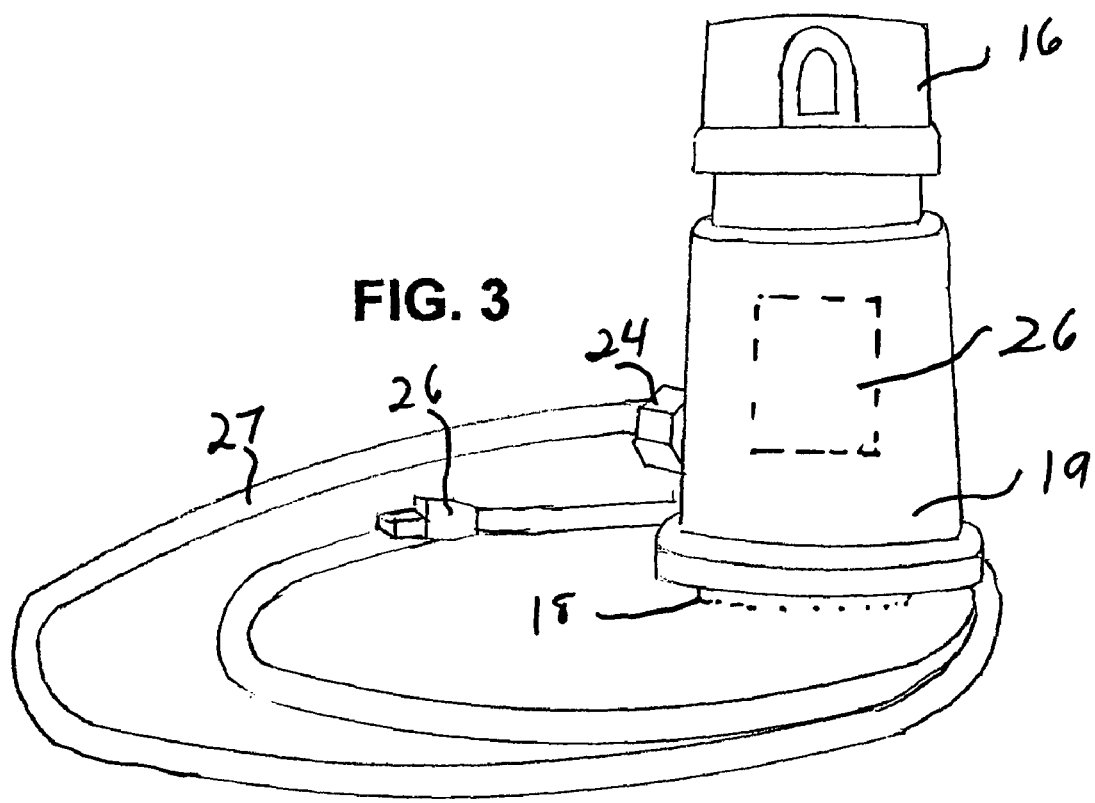
FIG. 3 illustrates an embodiment of the invention which includes not only a change from line voltage but also a specialized connector.

For quite some time both public and private authorities recognize the advantages of tapping power from street and area lights for various purposes. The problem was that, in many instances, the devices using the power in an auxiliary manner did not have the same timing requirements as the street or area lights themselves. For this reason, retrofit devices were established, such as that shown as reference numeral 10 in FIG. 1, which would allow the auxiliary devices to be turned on and off on a schedule different from the schedule developed for the street or area lights themselves. Hence, in FIG. 1, the line voltage is provided to an auxiliary device 20 and can be manipulated temporally (that is, shut on and off) at intervals independently from the control device 16 used for the street or area light itself 14.

The present invention shown in FIG. 2 generally as numeral 10 is different from the prior art in that, between the connection to the main power source 12 (which is at line voltage) and the ultimate connector to an auxiliary device 20, a power conversion circuitry element 26 intervenes so that the output is different from the line voltage in the sense of having a different voltage and possibly being direct current as opposed to alternating current. In addition, the ultimate output connector 28, rather than being standard line voltage outlet, is a connector specific to the anticipated application, taking into account its voltage and current.

A particular embodiment of the present invention is shown in FIG. 3. It is adapted (as is the prior art) to be connected to a NEMA three pole locking connector on a street or area light. It may include a photocontrol 16 for the simple day/night timing of the street light. (See the above cited U.S. Pat. No. 4,731,551). However, this embodiment includes a power circuitry conversion element 26 which in this case converts line voltage to the requirements of PoE (power over ethernet) and is provided with a cable 24 and connector 26 of the category 5/5e type appropriate for this conversion.

Figure 4:
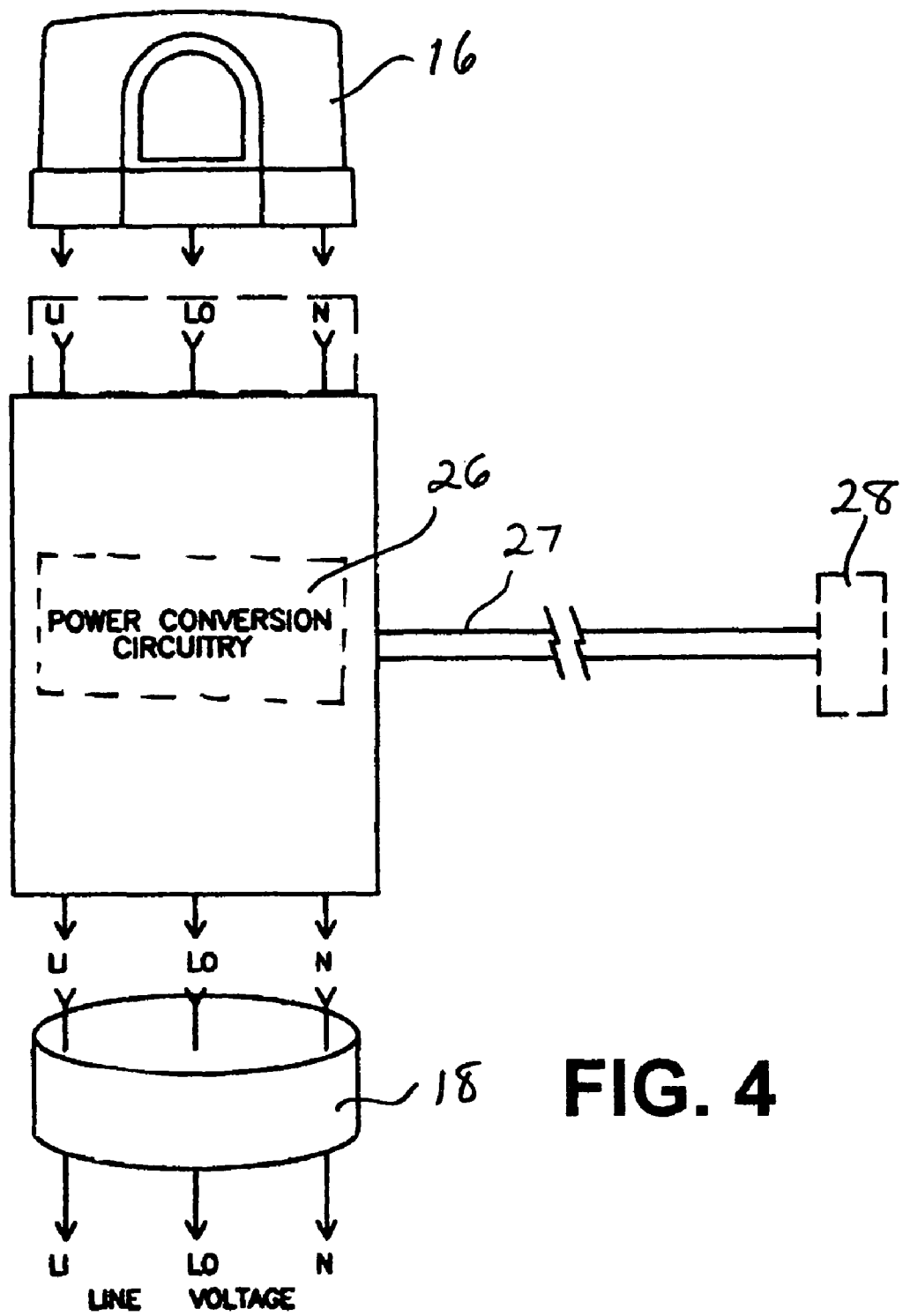
FIGS. 4, 5 and 6 illustrate various preferred configurations for the location of the power conversion circuitry and the specialized connectors, respectively.

The present invention encompasses three main configurations. In the first basic configuration of the invention (FIG. 4), the power circuitry conversion element 26 enclosed within the main body 19 of the device. The cable 27 exiting from this main body carries the converted power rather than line voltage and is terminated with the chosen connector, including a user specified connector end 28. This specified connector produces a non-zero output different from the AC line current.

Figure 5:
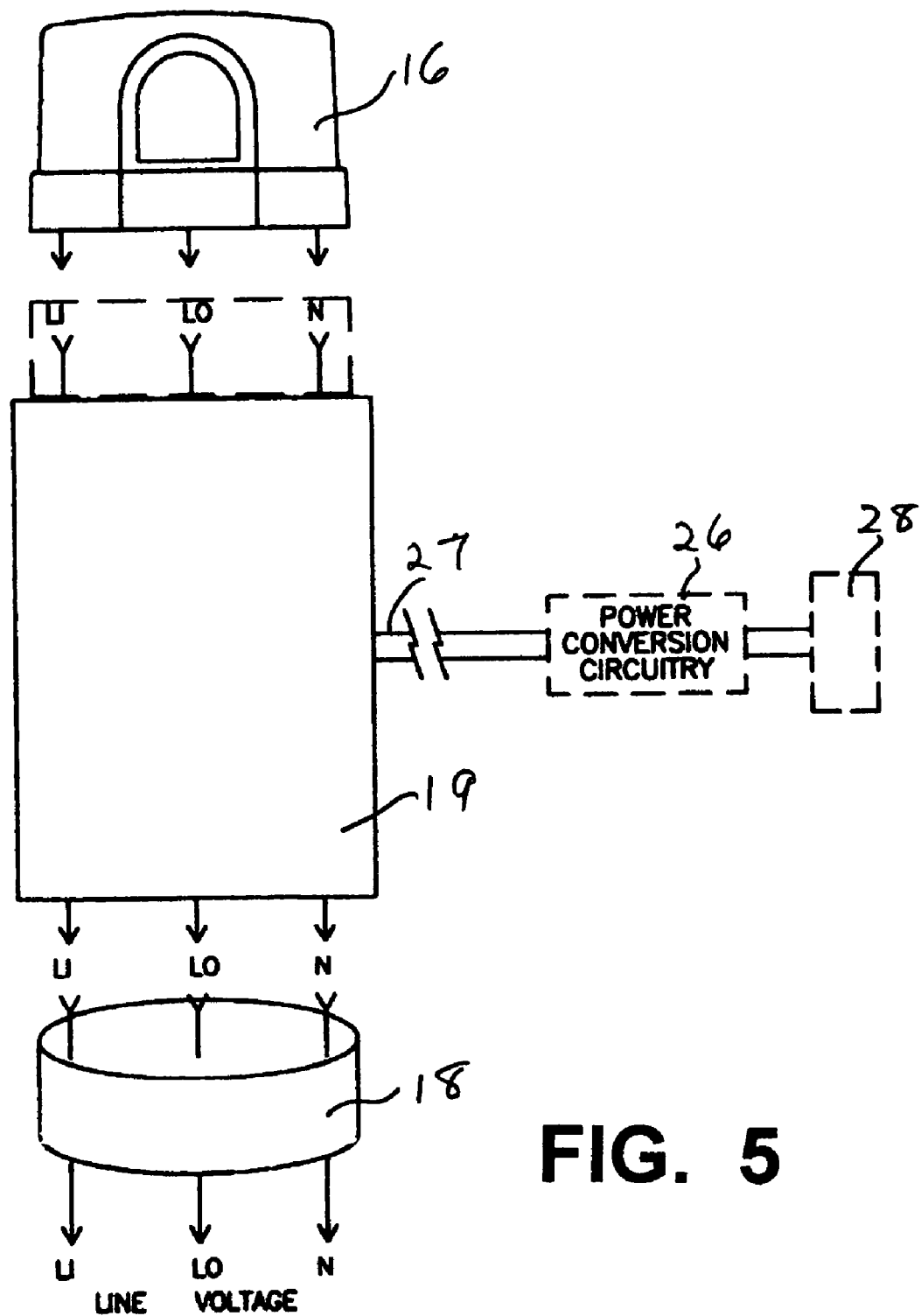

A second basic configuration (FIG. 5) includes a cable 24 coming from the main body 19 which is at line voltage which passes through the power conversion circuitry element 26 before terminating at the chosen connector end 28 which may be a user specified connector. Because the power conversion circuitry element 26, intervenes this connector produces an output which is different, in the ways specified, from the main line voltage.

Figure 6:
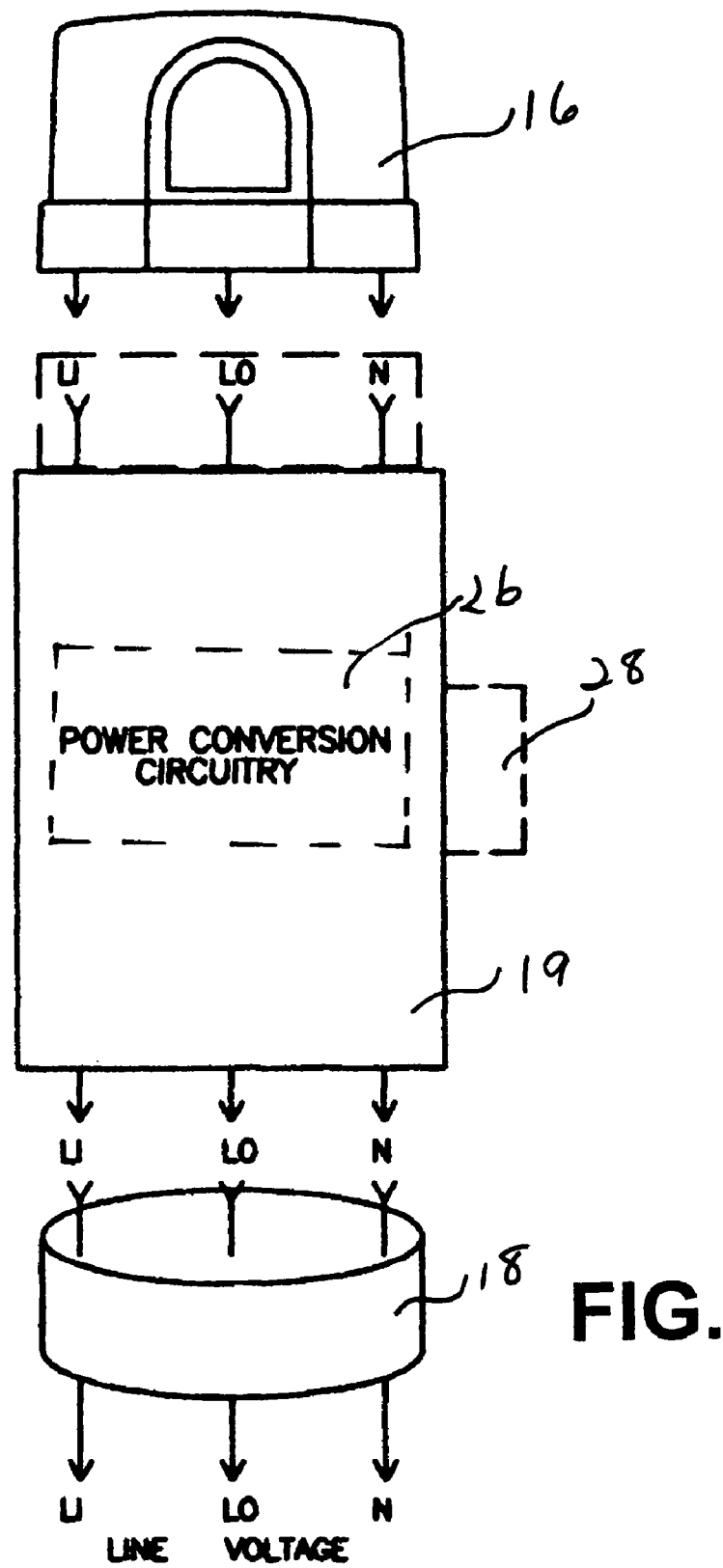

In FIG. 6, the power conversion circuitry element 26 is again included within the main body 19 of the device and the connector 28 for the auxiliary device or devices comprises a socket attached directly to this main body, providing a non-zero voltage different from line voltage.

Figure 7:
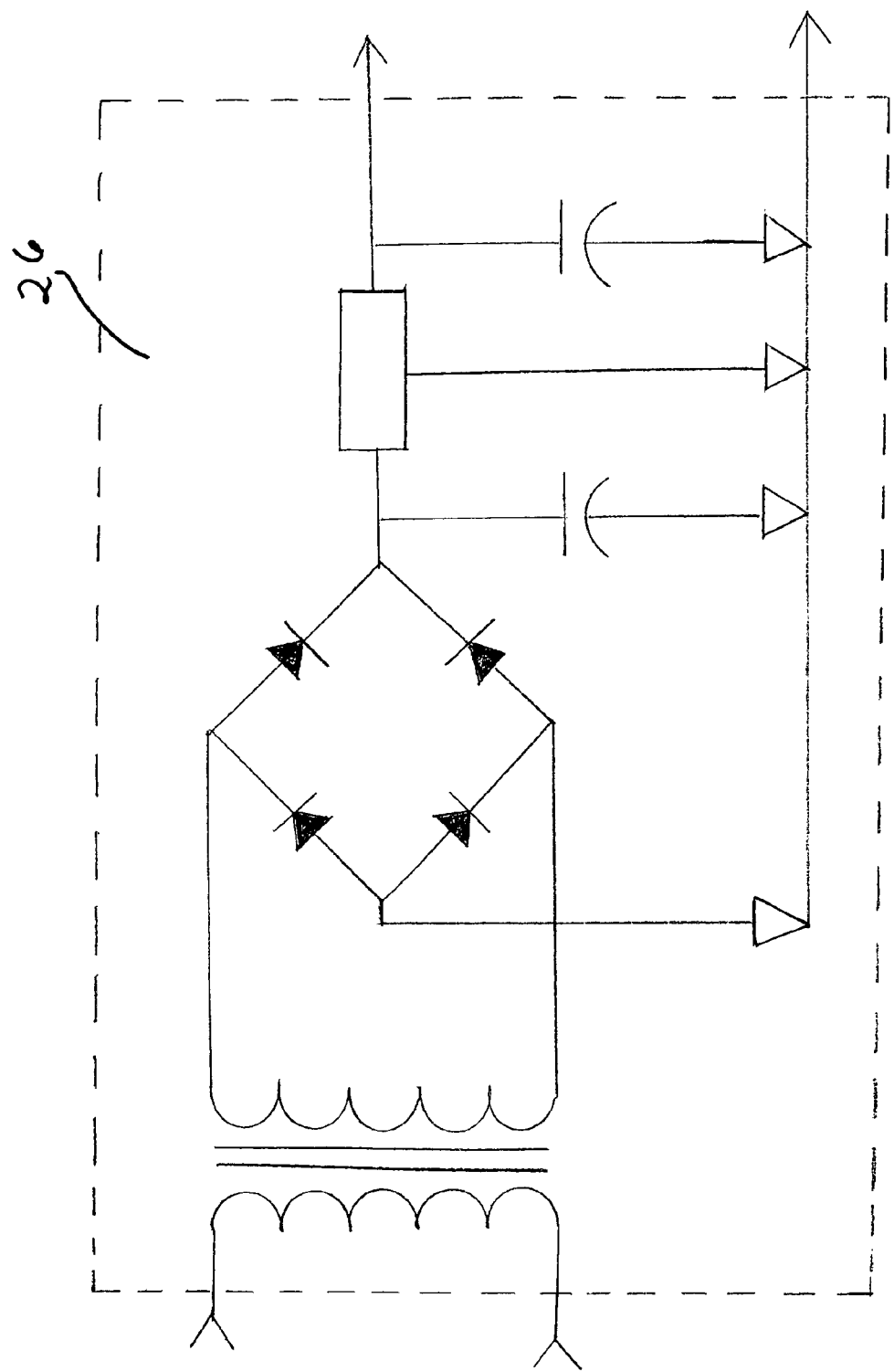
FIG. 7 is a simplified and generalized schematic of a typical known transformed rectifier/filter.

Power conversion elements suitable for this invention are well known and readily available. A simplified and generalized analog example is shown in FIG. 7. The circuitry can take many forms, both analog and digital.

The present invention is used in the following manner. A determination is made as to what kind of auxiliary devices and what kind of AC or DC power requirements can be expected in the foreseeable future. A device according to the present invention is installed, which includes one or more power conversion circuitry elements 26 which convert the line voltage into voltages appropriate for the anticipated uses. In addition, one or more specialized connectors 28 will be chosen suitable for the needs of the auxiliary devices.

Consequently a device according to the present invention is installed and used. An appropriate configuration is likely to be in stock since there is a fairly limited number of combinations of transformations and standard connectors that are likely to be in demand. A particular configuration and power output may also be custom made.

Among the advantages of the present invention are that the various auxiliary devices that use other than line voltage for operation would not have to convert the line voltage for their use. This would reduce heat generation, extend the life of the devices, and reduce the cost of the product.

The advantages for the manufacture would be that the connection points could be standardized to accept connectors for a single voltage input rather than having different models for the various electric system line voltages. This would improve their manufacturing efficiency, reduce their costs, and simplify the inventory.

A device according the present invention which includes power protection from line surge damage (for instance lightning, which is common to street lights), could carry within an umbrella protection for the auxiliary devices. Such surge protection could include but not be limited to metal/oxide varistors, fuses, and breakers.

If the main body of the device is provided with a weather resistant polycarbonate housing, it can be expected to resist outdoor degradation for quite some time.

The device when connected to both the power source and the photocontrol device advantageously includes locking-type brass legs.

Among the devices which could be included in such a device would be antennas of various types.

Among the various connectors which might be provided are included but not limited to power link, military specification, ethernet connection, and secondary wireless communications.

It should be understood that minor changes may be made in the form and construction of the invention without departing from the material spirit thereof. Therefore, it is not desired to confine the invention to the exact form herein shown and described, but it is desired to include all such as properly come within the scope claimed.

The invention having been thus described, what is claimed as new and desired to be secured by Letters Patent is:

1. A power conversion device, comprising:
   a main body having a top and a bottom, a center axis passing between the top and the bottom;
   a first connector attached to the bottom of the main body and aligned with the center axis, the first connector shaped and sized to connect the main body to a first NEMA locking three pole receptacle of a street light and adapted for attachment to a nominal 120 to 480 volts alternating current line voltage;
   a second connector attached to the top of the main body and aligned with the center axis, the second connector including a second NEMA locking three pole receptacle of the main body electrically coupled to the first connector such that each contact of the first NEMA locking three pole receptacle of the street light is reproduced at a corresponding contact of the second NEMA locking three pole receptacle of the main body;

a third connector attached to the main body at a location away from the center axis; and a power conversion circuit within the main body capable of changing nominal line voltage from the alternating current line voltage to a non-zero DC voltage for use by one or more auxiliary devices attached to the third connector, wherein the power conversion circuit provides the non-zero DC voltage continuously without any use of a timing circuit.

2. The power conversion device as recited in claim 1, wherein the power conversion circuit produces power output or outputs appropriate for one or more devices chosen from the group consisting of: decorative lights, WiFi, other communications systems, Universal Power Supply Systems, surveillance cameras, radios, Power over Ethernet, and antennas.

3. The power conversion device as recited in claim 1, further comprising: line surge power protection covering the outdoor installation itself and said one or more auxiliary devices.

4. The device as recited in claim 3, wherein the power protection is chosen from the group consisting of: metal/oxide varistors, fuses, and breakers.

5. The device as recited in claim 2, further comprising: line surge power protection covering the outdoor installation itself and said one or more auxiliary devices.

6. The device as recited in claim 5, wherein the power protection is chosen from the group consisting of: metal/oxide varistors, fuses, and breakers.

7. The device as recited in claim 1, wherein the main body includes a cylindrical weather resistant polycarbonate housing.

8. The device as recited in claim 2, wherein the main body includes a weather resistant polycarbonate housing.

9. The device as recited in claim 2 wherein the third connector is coupled to a cable coming from the main body.

10. The device as recited in claim 1, wherein the second NEMA locking three pole receptacle receives a photoelectric switch or one of a ganged set of remote switches to control a main lighting fixture of the street light, and provides the main lighting fixture with A/C line voltage.

11. The device as recited in claim 2, wherein the second NEMA locking three pole receptacle receives a photoelectric switch or one of a ganged set of remote switches to control a main lighting fixture of the street light, and provides the main lighting fixture with A/C line voltage.

12. A power conversion device for changing the power output of a street or outdoor area light to power one or more auxiliary devices having different power requirements, the power conversion device comprising:
 (a) a base adapted to connect securely to an NEMA three pole locking connector, including locking-type brass legs;
 (b) a main body comprising a cylindrical weather resistant polycarbonate housing;
 (c) an additional NEMA connector adapted to receive a photoelectric switch or one of a ganged set of remote switches to control the main lighting fixture, and provide the fixture with A/C line voltage;
 (d) a power conversion circuit within the main body capable of changing nominal line voltage, from an alternating current to a direct current greater than zero for use by one or more auxiliary devices attached to the main body through one or more external connectors of the main body, wherein the power conversion circuit provides the direct current continuously without any use of a timing circuit; and
 (e) a power protection element protecting the main load and providing umbrella protection for the one or more auxiliary devices.

13. The device as recited in claim 1, further comprising a shorting cap connected to the second connector to provide power to a main lighting fixture of the street light through the main body.

\* \* \* \* \*